United States Patent
Ngai et al.

(10) Patent No.: US 10,616,483 B1
(45) Date of Patent: Apr. 7, 2020

(54) APPARATUS AND METHOD OF GENERATING ELECTRONIC THREE-DIMENSIONAL WALKTHROUGH ENVIRONMENT

(71) Applicant: Hong Kong Applied Science and Technology Research Institute Company Limited, Hong Kong (HK)

(72) Inventors: Yat Cheung Ngai, Hong Kong (HK); Yin Yee Chan, Hong Kong (HK)

(73) Assignee: HONG KONG APPLIED SCIENCE AND TECHNOLOGY RESEARCH INSTITUTE COMPANY LIMITED, Hong Kong (HK)

( * ) Notice: Subject to any disclaimer, the term of this patent is extended or adjusted under 35 U.S.C. 154(b) by 0 days.

(21) Appl. No.: 16/288,075

(22) Filed: Feb. 27, 2019

(51) Int. Cl.
| | | |
|---|---|---|
| *H04N 5/232* | (2006.01) | |
| *G06T 3/40* | (2006.01) | |
| *G06T 7/50* | (2017.01) | |
| *G06T 7/80* | (2017.01) | |
| *G06K 9/62* | (2006.01) | |

(Continued)

(52) U.S. Cl.
CPC ....... *H04N 5/23238* (2013.01); *G06K 9/6201* (2013.01); *G06T 3/4038* (2013.01); *G06T 7/0002* (2013.01); *G06T 7/50* (2017.01); *G06T 7/80* (2017.01); *G06T 7/70* (2017.01); *G06T 2207/30168* (2013.01); *G06T 2207/30244* (2013.01)

(58) Field of Classification Search
CPC ......... H04N 5/23238; G06T 7/50; G06T 7/70; G06T 3/4038; G06T 7/0002; G06T 7/80; G06T 2207/30168; G06T 2207/30244; G06K 9/6201
See application file for complete search history.

(56) References Cited

U.S. PATENT DOCUMENTS

| | | |
|---|---|---|
| 7,567,274 B2 | 7/2009 | Ekpar |
| 7,990,394 B2 | 8/2011 | Vincent et al. |
| 8,705,892 B2 | 4/2014 | Aguilera et al. |

(Continued)

FOREIGN PATENT DOCUMENTS

EP 2779114 A1 9/2014

OTHER PUBLICATIONS

International Search Report of corresponding PCT Patent Application No. PCT/CN2019/077241 dated Nov. 27, 2019.

*Primary Examiner* — Mohammed S Rahaman
(74) *Attorney, Agent, or Firm* — Idea Intellectual Limited; Margaret A. Burke; Sam T. Yip

(57) ABSTRACT

A method of generating an electronic 3D walkthrough environment of a targeted environment, comprising: capturing a panorama at a first location point in the targeted environment; measuring an initial orientation of the camera whenever a panorama is captured; moving through the targeted environment and at each location point, capturing a live image of surrounding, and measuring an orientation of the camera; determining whether a new panorama is required to be captured at the current location point at where the camera is with the current orientation of the camera, comprising: identifying a sub-image in the panorama last captured that matches the live image captured; and if the sub-image cannot be identified, then a new panorama is required; and generating the electronic 3D walkthrough environment by connecting the panoramas captured.

18 Claims, 4 Drawing Sheets

(51) Int. Cl.
    *G06T 7/70*         (2017.01)
    *G06T 7/00*         (2017.01)

(56)           References Cited

U.S. PATENT DOCUMENTS

| | | | |
|---|---|---|---|
| 8,893,026 B2 | 11/2014 | Lindemann et al. | |
| 9,189,839 B1 | 11/2015 | Sheridan et al. | |
| 10,521,954 B2 * | 12/2019 | Holzer | H04N 5/265 |
| 2002/0113805 A1 | 8/2002 | Li et al. | |
| 2002/0126913 A1 | 9/2002 | Kotake et al. | |
| 2002/0126914 A1 | 9/2002 | Kotake et al. | |
| 2003/0091226 A1 | 5/2003 | Cahill et al. | |
| 2005/0018058 A1 | 1/2005 | Aliaga et al. | |
| 2011/0141227 A1 * | 6/2011 | Bigioi | H04N 13/106 348/36 |
| 2013/0210563 A1 * | 8/2013 | Hollinger | H04N 5/2252 473/570 |
| 2013/0271462 A1 | 10/2013 | Frank | |
| 2013/0278755 A1 * | 10/2013 | Starns | G01C 11/02 348/135 |
| 2014/0300686 A1 * | 10/2014 | Campbell | H04N 5/23238 348/36 |
| 2015/0062292 A1 * | 3/2015 | Kweon | H04N 5/23238 348/37 |
| 2017/0067739 A1 * | 3/2017 | Siercks | G06T 7/97 |
| 2017/0365102 A1 * | 12/2017 | Huston | H04N 5/23238 |
| 2018/0032214 A1 | 2/2018 | Chen | |

\* cited by examiner

APPARATUS AND METHOD OF GENERATING ELECTRONIC THREE-DIMENSIONAL WALKTHROUGH ENVIRONMENT

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates generally to the production of electronic 3D walkthrough environment using two-dimensional panorama images.

BACKGROUND OF THE INVENTION

One form of electronic 3D walkthrough environment is created using a set of connected panorama images in where a viewer can navigate and experience the simulated electronic 3D environment as one panorama after another being presented before the viewer. A panorama means an unbroken view of a scene from a viewpoint. A panorama can be either a series of photographs or panning video footage. The terms: "panoramic tour" and "virtual walkthrough" have mostly been associated with virtual tours created using still cameras. Such a virtual tour is made up of a number of photo-shots taken from a single vantage point.

Different from virtual tours, in making a video tour, the targeted environment is filmed at a walking pace while moving continuously from one location point to another throughout the targeted environment using a video camera. The benefit of video tour is that the point of view is constantly changing throughout a pan. However, capturing high-quality video requires significantly higher technical skill and more expensive equipment than those in taking digital still pictures. The video also takes away viewer control and interaction of the tour; thus, the tour is the same for all viewers and the subject matter can only be that chosen by the videographer.

There are many applications for electronic 3D walkthroughs, such as that in providing an immersed and interactive visual experience of a remote destination for a viewer without her physical presence. Electronic 3D walkthroughs are being used in many augmented reality or electronic 3D reality (AR/VR) applications for virtual tour and environment navigation. Traditional seamless walkthrough experience requires high-cost depth camera, intensive computational power, and very large storage capacity in reconstructing the three-dimensional scenes at numerous location points and viewpoints. To lower cost, more economical 360 cameras are more and more frequently used in place of the depth cameras. However, the panoramas needed to be stitched together manually in this case. As such, until today electronic 3D walkthroughs in mobile and time-critical applications are very limited.

Therefore, there is an unmet need for techniques of generating two dimensional (2D) panoramas-based electronic 3D walkthroughs with seamless scene transitions that require no manual stitching of the panoramas, less computational power, compact storage capacity, and inexpensive equipment.

SUMMARY OF THE INVENTION

The present invention provides an apparatus and method of generating electronic 3D walkthrough environments. It is an objective of the present invention to provide such apparatus and method that do not require any lengthy or manual post processing of images taken of the targeted environments. It is also the objective of the present invention to provide such apparatus and method that require less computational power, more compact storage capacity, and relatively inexpensive equipment than traditional approaches but yet can achieve comparable quality in the resulting electronic 3D walkthrough environments.

In accordance to one embodiment of the present invention, a method of panorama-based electronic 3D walkthrough production comprises a photographer walking through a targeted environment stopping at a number of location points to capture live images using a camera; tracking the location points (in the x, y, and z absolute coordinates or relative coordinates that are relative to a fixed spatial point) at where the camera is and the camera's orientations (absolute and relative) for its vantage point (the camera's standpoint from which the surrounding of the location point is viewed) and view direction using a positional tracking sub-system, and relaying this information along with the captured live images to a computing device; determining, by the computing device, whether a new panorama is required at the current location point where the camera is with the camera's current orientation as the photographer walks through the targeted environment; sending notification data messages to notify the photographer to take new panoramas where needed; and creating seamless scenes of the environment automatically by the computing device.

Throughout this document, a x, y, and z absolute coordinate or relative coordinate of a location point means an absolute coordinate or relative coordinate in the three-dimensional space represented by values in the lateral (x) direction, the depth (y) direction, and the altitude (z) direction.

In accordance to one embodiment, the apparatus for generating the panorama-based electronic 3D walkthrough comprises one or more optical sensors (e.g. a 360 camera) configured to capture panoramas; a positional tracking sub-system configured to track the location points at where the optical sensors are and orientations of the optical sensors. In one embodiment where processing of the panoramas is done remotely in a remote computing device, the apparatus further comprises a data communication circuitry configured to transmit the captured panoramas along with the location point at where the optical sensors are and the optical sensors' orientation information to the remote computing device, and to receive notification or command data from the remote computing device. In another embodiment where processing of the panoramas is done locally, the apparatus further comprises data storage configured for storing the captured panoramas and the result runtime electronic 3D walkthrough scenes data, and a processor configured to determine where new panoramas are required during the production walk through and to generate the runtime electronic 3D walkthrough environment.

BRIEF DESCRIPTION OF THE DRAWINGS

Embodiments of the invention are described in more detail hereinafter with reference to the drawings, in which.

DETAILED DESCRIPTION

In the following description, apparatuses and methods of generating electronic 3D walkthrough environments, and the likes are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

There are mainly two traditional approaches of panorama-based electronic 3D walkthrough productions: manual and automatic. Under the manual approach, a photographer is to walk through a targeted environment stopping at various location point to take panoramas, optionally with different vantage points and/or view directions. The panoramas are then uploaded to a computing device for manual stitching to create the seamless scenes. An experienced photographer would be able to determine the minimum number of panoramas needed to be captured for the location points, vantage points, and/or view directions for seamless scene transition without excessive photo-shots containing duplicated information; hence the requirement on data storage can be relatively lower. Under the automatic approach, on the other hand, panoramas at every location point, every vantage point, and every view direction are captured indiscriminative. The panoramas are then processed by an image processing algorithm to create the seamless scenes of the environment automatically. This requires substantial amount of computational power for the image process algorithm and data storage capacity for the enormous amount of the captured panoramas.

Figure 1:
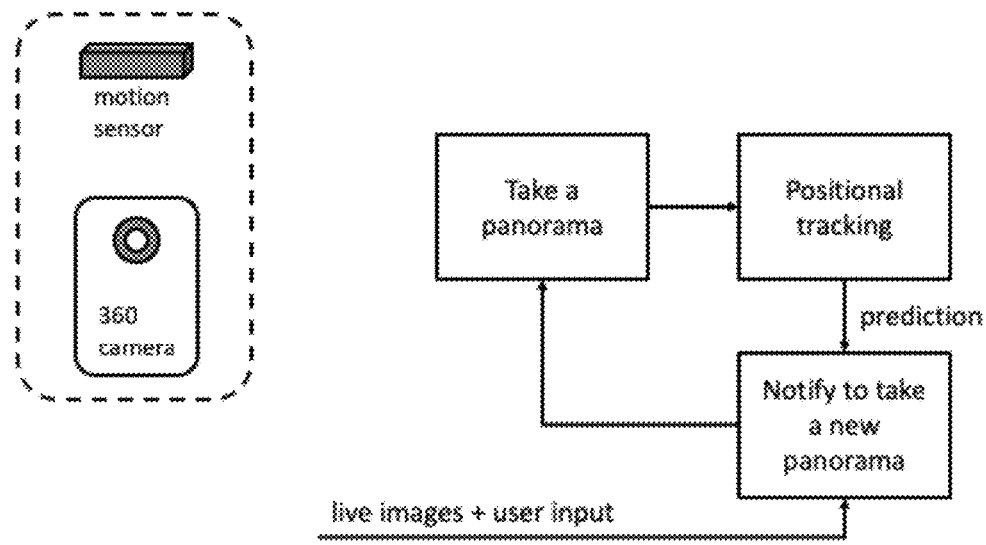
FIG. 1 illustrates the basic principle of a method of generating electronic 3D walkthrough environments in accordance to one embodiment of the present invention.

Referring to FIG. 1. In accordance to one embodiment of the present invention, a method of panorama-based electronic 3D walkthrough production comprises a photographer walking through a targeted environment stopping at a number of location points to capture live images using a camera; tracking the location points (in the x, y, and z absolute coordinates or relative coordinates that are relative to a fixed spatial point) at where the photographer (or more precisely the camera) is and the camera's orientations (absolute and relative) using a positional tracking sub-system, and relaying this information along with the captured live images to a computing device; recording the absolute or relative coordinate of every location point in the targeted environment; determining, by the computing device, whether a new panorama is required at the current location point at where the camera is with the camera's current orientation; if it is determined to be required at the current location point, sending notification data messages to notify the photographer to take a new panorama, and recording the camera's relative orientation in relative to the camera orientation when the last panorama was taken; and creating seamless scenes of the environment automatically from the panoramas taken and the recorded absolute or relative coordinates of the location points by the computing device.

In other embodiments, the photographer in the production walk through may be replaced by an aero-, land-, surface water-, or underwater-drone depending on the nature of the targeted environment. In such case, the selective panoramas capture is autonomous with the tracking of the location points at where the camera is and camera's orientations tracking, determination of where new captures of panoramas are needed can be integrated with the self-guidance system of the drone.

Figure 2:
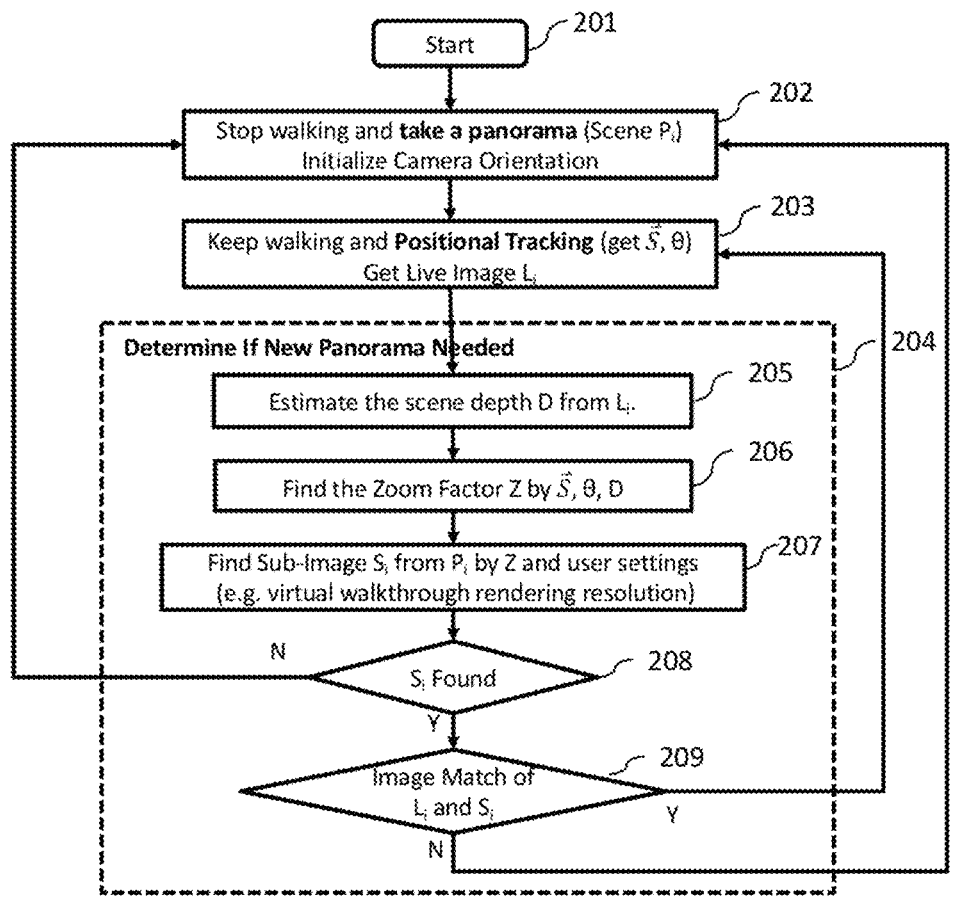
FIG. 2 depicts a process flow diagram of a method of generating electronic 3D walkthrough environments in accordance to one embodiment of the present invention.

Referring to FIG. 2. In accordance to one embodiment of the present invention, the electronic 3D walkthrough production process comprises the following steps:

(201): a photographer beginning a production walk through of a targeted environment stopping at a number of selected location points to take panoramas with a camera with tracking of and recording the position (the x, y, and z absolute coordinates or relative coordinates that are relative to a fixed spatial point) of the photographer (or more precisely of the camera) at every location point;

(202): the photographer stopping at the first location point or the location point where it is determined to be required and taking a panorama of the scene, $P_i$, at the location point, i (i=0 for the first location point), wherein the horizontal view of the panorama is ≤360° and the vertical view of the panorama is ≤180°; and measuring and recording the camera's initial orientation, θ, and if it is not at the first location point, measuring a relative orientation, θ, in relative to the camera's initial orientation recorded at the location point where the last panorama was taken;

(203): the photographer continuing to walk through the targeted environment while the x-y-z coordinates (absolute or relative) of the location points at where the camera is continuously being tracked and recorded, and the relative orientations of the camera continuously being measured for determining a camera displacement vector, $\vec{S}$, (from the last location point where a panorama was captured, and which is computed from the recorded x-y-z coordinates), and a camera's relative orientation, θ, which is the angle of the camera's direct viewing in relative to the camera's initial orientation; the camera continuously capturing a live image, $L_i$, of the surrounding of each location point, i∈{0, 1, 2, ..., n};

(204): determining, by a processor, whether a new panorama is required at the location point, i, comprising:

(205): estimating a scene depth, D, from the live image, $L_i$;

(206): determining a zoom factor, Z, from the camera displacement vector, $\vec{S}$, the camera's relative orientation, θ, and the scene depth, D;

(207): identifying a sub-image, $S_i$, from the last panorama captured, $P_{i=T}$ (where the last panorama is captured at location point T), matching the live image, $L_i$, using the zoom factor, Z, and one or more configurable setting parameters (e.g. the electronic 3D walkthrough image rendering resolution);

(208): if the sub-image, $S_i$, cannot be found, a new panorama is determined to be required and repeat from step 202; otherwise, (209): determining if the identified sub-image, $S_i$, meets a quality threshold in matching the live image, $L_i$; and if not, a new panorama is determined to be required and repeat from step 202; otherwise, repeat from step 203.

In accordance to one embodiment, the estimation of a scene depth, D, from the live image, $L_i$, comprises: defining a point of interest (POI) of the live image, $L_i$, which can be the center of the live image, $L_i$; identifying one or more feature points in the live image, $L_i$; for each feature point, j, determining a feature point depth, $d_j$, using the positional tracking sub-system, and a distance, $p_j$, between the feature point, j, and a center of the POI; and estimating the scene depth, D, by finding:

$$D = \frac{\sum \left(1 - \frac{p_j}{r}\right) d_j}{\sum \left(1 - \frac{p_j}{r}\right)}; \tag{1}$$

where $p_j$ can be found by:

$$p_j = \sqrt{\left(u_j - \frac{w}{2}\right)^2 + \left(v_j - \frac{h}{2}\right)^2}; \tag{2}$$

where:
$u_j$ is the horizontal distance from the closest side edge of the live image, $L_i$;
$v_j$ is the vertical distance from the closest top or bottom edge of the live image, $L_i$;
w is the width of the live image, $L_i$;
h is the height of the live image, $L_i$; and
r is the maximum distance between the center and boundary of the POI and r<w, h.

In one embodiment, the POI is defined as the circular area of certain size at the center of the live image, $L_i$, as it is often that a viewer's focus falls on the object(s) appearing at center of an image. In other embodiments, the POI can be defined differently based on criteria known and reasonably foreseeable by a skilled person in the art.

Figure 3:
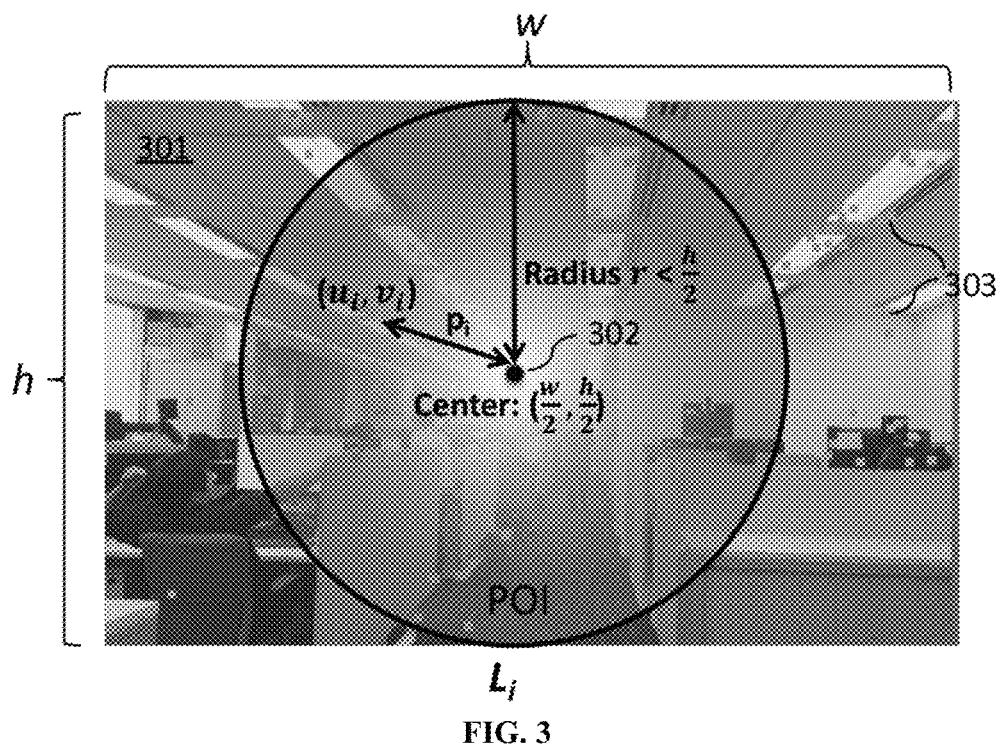
FIG. 3 illustrates the process of estimation of a scene depth of a live view of surrounding of a location point in a targeted environment in accordance to one embodiment of the present invention.

FIG. 3 illustrates the aforesaid estimation of a scene depth, D, with a live image (301), a defined POI (302), and visual features (303).

In accordance to one embodiment, the determination of zoom factor, Z, comprises: determining a displacement vector, $\vec{S}$, , of the path travelled by the camera from the location point, T, where the last panorama, $P_{i=T}$, is captured and the current location point, i, where the live image, $L_i$, is captured; determining a depth vector, $\vec{V}$, , using the scene depth, D, estimated from the live image, $L_i$, and the camera's relative orientation, θ; and determining the zoom factor, Z, using the depth vector, $\vec{V}$, , and the displacement vector, $\vec{S}$, .

Figure 4:
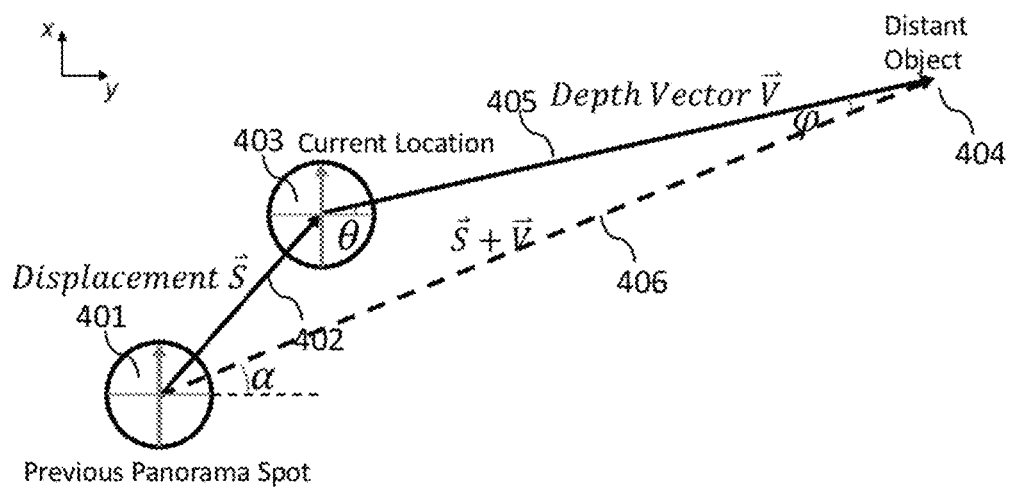
FIG. 4 illustrates the process of determination of a zoom factor of a sub-image within a panorama previously captured in relation with a live view of surrounding of a location point in a targeted environment in accordance to one embodiment of the present invention.

FIG. 4 illustrates the aforesaid determination of zoom factor, Z. Location point, T (401) is where the last panorama, $P_{i=T}$, was captured and the camera has travelled the path (402) reaching the current location point, i (403) with the displacement vector, $\vec{S}$, . The distant object (404) is the POI of the live image, $L_i$, being captured by the camera at the location point, i (403). The camera's relative orientation, θ, at the location point, i (403), is the angle of the camera's direct view (405) of the POI in relative to the camera's initial orientation. The depth vector, $\vec{V}$, , of the live image, $L_i$, is determined by finding:

$$\vec{V}, = D \cos θ \hat{i} + D \sin θ \hat{j} \tag{3}$$

where:
$\hat{i}$ is the unit vector in the x direction; and
$\hat{j}$ is the unit vector in the y direction.

The angular difference, φ, between the line (406) of view angle of the POI, α, in the last panorama, $P_{i=T}$ (where the last panorama is captured at location point T), and the camera's direct view (405) of the POI at the current location point, i (403), can be found by:

$$\varphi = \cos^{-1} \frac{\vec{V} \cdot (\vec{S} + \vec{V})}{|\vec{V}||\vec{S} + \vec{V}|} \tag{4}$$

Lastly, the zoom factor, Z, is determined by finding:

$$Z = \frac{|\vec{V}|\cos\varphi}{|\vec{S} + \vec{V}|} = \frac{\vec{V} \cdot (\vec{S} + \vec{V})}{|\vec{S} + \vec{V}|^2} \tag{5}$$

Figure 5:
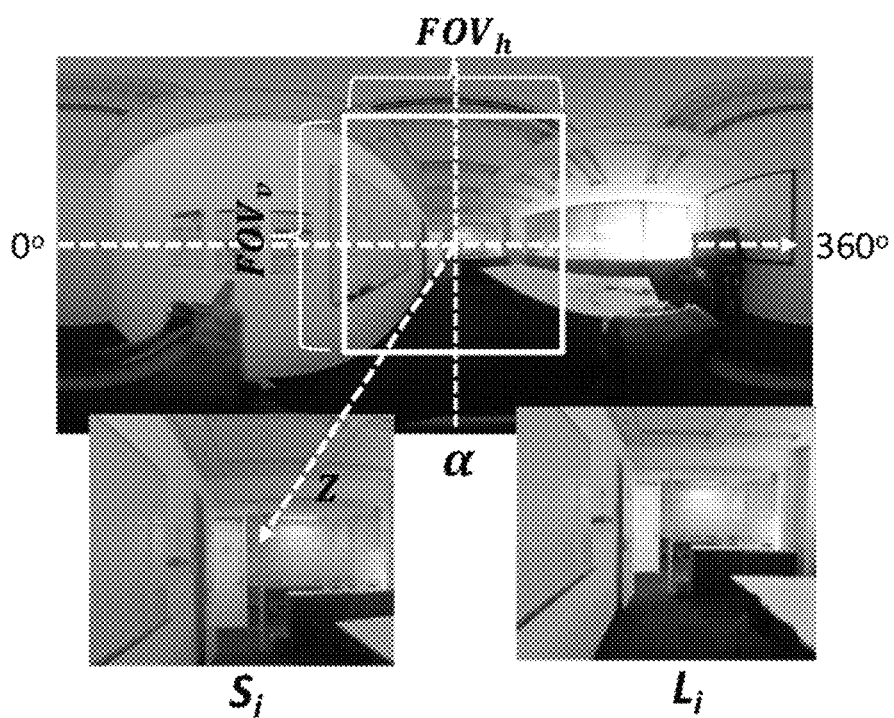
FIG. 5 illustrates the process of identification of a sub-image within a panorama previously captured that match a live view of surrounding of a location point in a targeted environment in accordance to one embodiment of the present invention.

FIG. 5 illustrates the aforesaid identification of a sub-image, $S_i$, from the last panorama captured, $P_{i=T}$. In general, when the live image, $L_i$, being captured at the current location point, i, cannot be rendered from the last panorama captured, $P_{i=T}$, a new panorama is required at the current location point, i. In other words, if an undistorted sub-image, $S_i$, of the last panorama captured, $P_{i=T}$, by an angular horizontal field of view ($FOV_h$), which corresponds to the width, w, of the live image, $L_i$, an angular vertical field of view ($FOV_v$), which corresponds to the height, h, of the live image, $L_i$, the view angle of the POI, α, in the last panorama, $P_{i=T}$, and the zoom factor, Z, cannot be extracted from the last panorama captured, $P_{i=T}$, then a new panorama is required at the current location point, i.

In accordance to one embodiment, it is considered that a sub-image, $S_i$, is unidentifiable from the last panorama captured, $P_{i=T}$, if the absolute angular difference, φ, between the vertical central line of horizontal view angle of the POI, α, in the last panorama, $P_{i=T}$, and the camera's direct view of the POI at the current location point, i, is larger than one half of the angular horizontal field of view ($FOV_h$); that is:

$$\text{if } |\varphi| > \frac{FOV_h}{2}, \text{ then } S_i = \text{Null}. \tag{6}$$

In accordance to another embodiment, it is considered that a sub-image, $S_i$, is unidentifiable from the last panorama captured, $P_{i=T}$, if the zoom factor, Z, is lower than a zoom factor threshold, $Z_{threshold}$; that is, if $Z < Z_{threshold}$, then $S_i$=Null. The zoom factor threshold, $Z_{threshold}$ is a configurable setting that may be defined and/or influenced by one or more parameters including one or more intrinsic characteristics of the camera, the image size of the panoramas captured, the runtime electronic 3D walkthrough image display window size, and the desired runtime electronic 3D walkthrough maximum-zoom-in resolution. In one embodiment, the zoom factor threshold, $Z_{threshold}$, bears a proportional relationship with:

$$\max_{i=0...n}\left(\frac{w_r}{w_{S_i}}, \frac{h_r}{h_{S_i}}\right);$$

where:
$w_r$ is the runtime electronic 3D walkthrough image rendering width;
$w_{S_i}$ is the width of sub-image, $S_i$;
$h_r$ is the runtime electronic 3D walkthrough image rendering height; and
$h_{S_i}$ is the height of sub-image, $S_i$; and
where:

$$w_{S_i} = \text{width of } P_{i=T} * \left(\frac{FOV_h}{360°}\right);$$

and $$h_{S_i} = \text{height of } P_{i=T} * \left(\frac{FOV_v}{180°}\right);$$

where the last panorama is captured at location point T.

In accordance to one embodiment, the determination of whether an identified sub-image, $S_i$, meets a matching quality threshold in matching the live image, $L_i$, comprises first determining an initial score, $\sigma_{init}$, of image match quality between the identified sub-image, $S_{i=T}$, of the captured panorama, $P_{i=T}$, and the corresponding live image, $L_{i=T}$ taken at a location point T. In this case, the displacement vector, $\vec{S}_i$, is $\emptyset$, the camera's relative orientation, $\theta$, is 0°, and the zoom factor, Z, should be 1 if the same camera is used to capture the panoramas and the live images, and otherwise approaching 1. The determination further comprises determining a score, $\sigma_i$, of image match quality between the identified sub-image, $S_i$, and the corresponding live image, $L_i$ taken at location point, i, by finding:

$$\sigma_i = \frac{\sum_{x,y} S'_i(x, y) L'_i(x, y)}{\sqrt{\sum_{x,y} S'_i(x, y)^2 L'_i(x, y)^2}}; \quad (7)$$

where $$S'_i(x, y) = S_i(x, y) - \frac{1}{w \cdot h} \sum_{x',y'} S_i(x', y'); \text{ and} \quad (8)$$

$$L'_i(x, y) = L_i(x, y) - \frac{1}{w \cdot h} \sum_{x',y'} L_i(x', y'); \quad (9)$$

where:
x and y indicate the image coordinate;
$S_i(x, y)$ is the image intensity at the x-y coordinate of the identified sub-image, $S_i$, corresponding to the live image, $L_i$ taken at location point, i;
$L_i(x, y)$ is the image intensity at the x-y image coordinate of live image, $L_i$ taken at location point, i;

$$\frac{1}{w \cdot h} \sum_{x',y'} S_i(x', y')$$

is the image intensity mean of the identified sub-image, $S_i$, corresponding to the live image, $L_i$ taken at location point, i; and $$\frac{1}{w \cdot h} \sum_{x',y'} L_i(x', y')$$

is the image intensity mean of live image, $L_i$ taken at location point, i.

And if the score, $\sigma_i$, of image match quality between the identified sub-image, $S_i$, and the corresponding live image, $L_i$ taken at location point, i, is less than $k*\sigma_{init}$, then a new panorama is needed to be captured at location point, i, wherein $0<k<1$, can be ½; that is $\sigma_i<\sigma_{init}/2$.

In accordance to one embodiment of the present invention, as a production walk through proceeds through the targeted environment, a plurality of panoramas are captured at a number of selected location points, the coordinates of the location points, continuous streams of data records of six-degree-of-freedom (6DoF) (x, y, z, pitch, yaw, and roll) moving trajectory of the camera, and zoom factors obtained are stored in non-transient memory storage. By extracting the three-degree-of-freedom (3DoF) (x, y, and z) trajectory data from the 6DoF camera trajectory data records, a 2D map of the runtime electronic 3D walkthrough environment is constructed. The hotspots of the runtime electronic 3D walkthrough environment, which are the selected location points where the panoramas are captured, are rendered using the captured panoramas on 6DoF. The transition effects between connected panoramas are then rendered using the zoom factors obtained.

Figure 6:
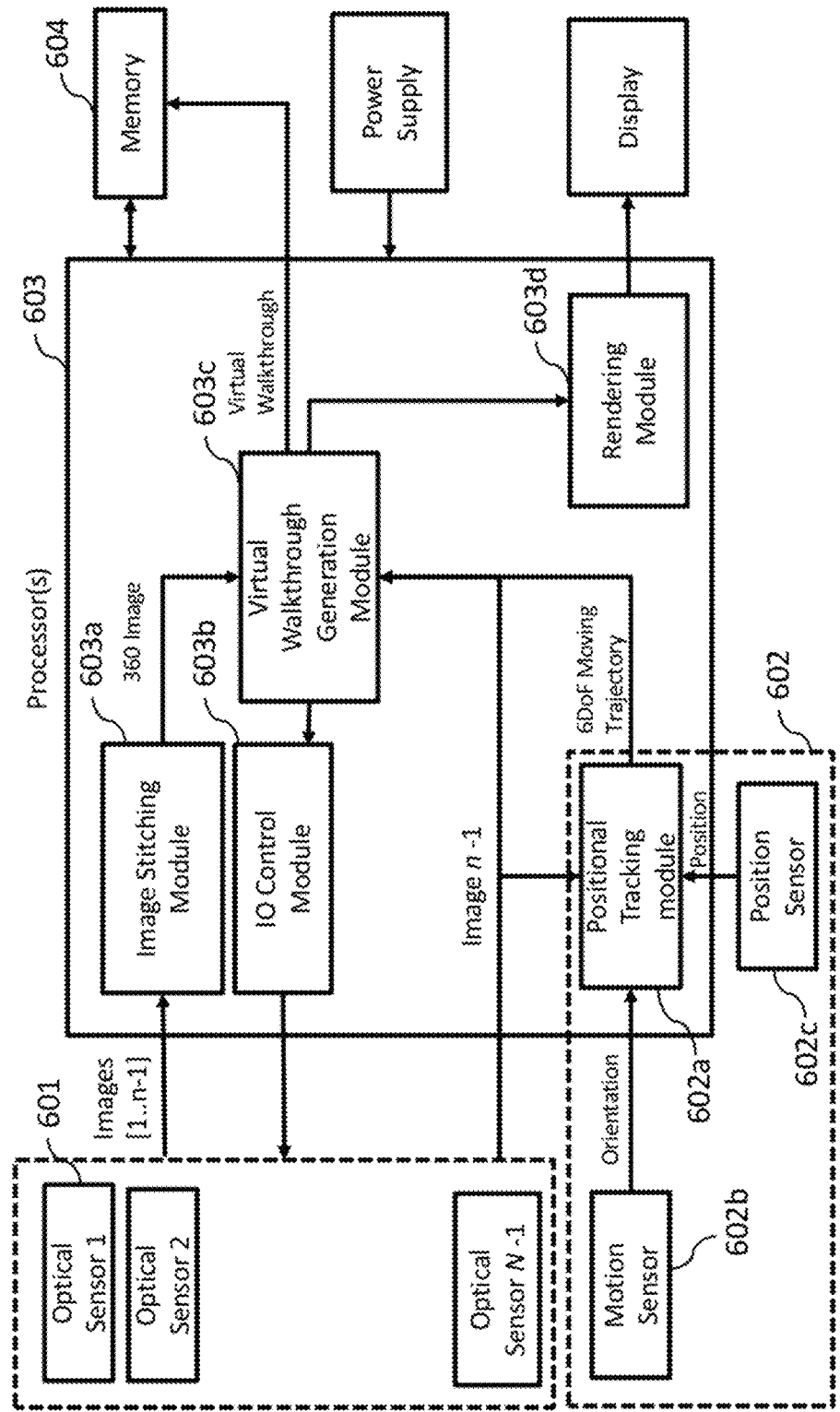
FIG. 6 depicts a logical block diagram of a hardware implementation in accordance to one embodiment of the present invention.

Referring to FIG. 6. In accordance to one embodiment, the apparatus for generating the panorama-based electronic 3D walkthrough comprises one or more optical sensors (601) configured to capture panoramas, wherein the one or more optical sensors can be one or more wide-angle cameras, a single 360 camera, or any combination of optical sensors forming a 360 camera; a positional tracking sub-system (602) configured to track the positions (the x, y, and z absolute coordinates or relative coordinates that are relative to a fixed spatial point of the location points at where the optical sensors are) and orientations of the optical sensors, wherein the positional tracking sub-system (602) may comprise a motion sensor (602b), which can be a gyroscope, a combination of one or more of inertial measurement units (IMUs), light detection and ranging (LiDAR) systems, or other known motion sensing device, a position sensor (602c), and a positional tracking module (602a), which can be a GPS transceiver, a wireless communication transceiver capable of triangulation of wireless signals, a combination of one or more of visual simultaneous localization and mapping (SLAM), RGB-D SLAM, a visual-inertial odometer, or other known position tracking device, for processing the orientation and position data. In one embodiment where processing of the panoramas is done remotely in a computing device, such as a server computer, the apparatus further comprises a data communication circuitry configured to transmit the captured panoramas along with the coordinate information and the optical sensors' orientation information to the remote computing device, and to receive notification or command data from the remote computing device. In another embodiment where processing of the panoramas is done locally, the apparatus further comprises a processor (603) having an image stitching module (603*a*) for stitching the panoramas captured to create the run-time electronic 3D walkthrough environment scene images, an IO control module (603*b*) for controlling the optical sensors (601), a virtual walkthrough generation module (603*c*) for determining where new panoramas are required during the production walk through and for generating the run-time electronic 3D walkthrough environment, and a rendering module (603*d*) for rendering the run-time electronic 3D walkthrough environment scene images. The positional tracking module (602*a*) can also be incorporated in the processor (603). In the embodiment where processing of the panoramas is done locally, the apparatus further comprises a data storage memory (604) configured for storing the coordinate information and the optical sensors' orientation information, the captured panoramas, and the resulting runtime electronic 3D walkthrough scenes data.

An ordinarily skilled person in the art can appreciated that other embodiments comprising different number of local and/or remote processors for executing and performing different aforesaid functions are readily realizable without undue experiments or deviation from the spirit of the present invention.

The electronic embodiments disclosed herein may be implemented using one or more computing devices, computer processors, or electronic circuitries including but not limited to application specific integrated circuits (ASIC), field programmable gate arrays (FPGA), and other programmable logic devices specially configured or programmed according to the teachings of the present disclosure. Machine instructions executing in and/or electronic circuitry configurations in the computing devices, computer processors, or programmable logic devices can readily be prepared by practitioners skilled in the computer and electronic art based on the teachings of the present disclosure.

The aforesaid computing devices, computer processors, or electronic circuitries may be incorporated in one or more server computers, personal computers, laptop computers, mobile computing devices such as smartphones and tablet computers.

The electronic embodiments include transient and non-transient electronic storage media having machine instructions and/or electronic circuitry configuration data stored therein which can be used to configured computing devices, computer processors, or electronic circuitries to perform any of the processes of the present invention. The storage media can include, but are not limited to, floppy disks, optical discs, Blu-ray Disc, DVD, CD-ROMs, and magneto-optical disks, ROMs, RAMs, flash memory devices, or any type of media or devices suitable for storing instructions, codes, and/or data.

Various embodiments of the present invention also may be implemented in distributed computing environments and/or Cloud computing environments, wherein the whole or portions of machine instructions are executed in distributed fashion by one or more processing devices interconnected by a communication network, such as an intranet, Wide Area Network (WAN), Local Area Network (LAN), the Internet, and other forms of data transmission medium.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated.

What is claimed is:

1. A method of generating an electronic three-dimensional (3D) walkthrough environment of a targeted environment, comprising:
   at a first location point in the targeted environment:
   capturing, by an optical sensor, a first panorama;
   measuring and recording, by a positional tracking system, an initial orientation of the optical sensor; and
   tracking and recording, by the positional tracking system, a first coordinate of the optical sensor;
   moving the optical sensor through the targeted environment and at each location point in the targeted environment:
   capturing, by the optical sensor, a live image of surrounding;
   measuring, by the positional tracking system, a relative orientation of the optical sensor, wherein the relative orientation is measured in relative to the initial orientation;
   tracking and recording, by the positional tracking system, a coordinate of the optical sensor;
   determining whether a new panorama is required to be captured, comprising:
   identifying, by a first processor, a sub-image in the panorama last captured that matches the live image captured; and
   if the sub-image cannot be identified, then a new panorama is required to be captured at the current location point with the current relative orientation of the optical sensor; and
   if it is determined a new panorama is required to be captured at the current location point, then:
   capturing, by the optical sensor, a new panorama at the current location point; and
   measuring and recording, by the positional tracking system, a new initial orientation of the optical sensor.

2. The method of claim 1, further comprising:
   generating, by a second processor, the electronic 3D walkthrough environment by connecting the panoramas captured to create seamless scenes of the electronic 3D walkthrough environment, and by creating a two-dimensional map of the electronic 3D walkthrough environment from the coordinates of the optical sensor recorded at the location points.

3. The method of claim 1, wherein the identification of a sub-image in the panorama last captured that matches the live image captured comprises:
   estimating a scene depth from the live image captured;
   determining a zoom factor from a displacement vector and the relative orientation of the optical sensor at the current location point where the live image is captured, and the scene depth; and
   identifying the sub-image using the zoom factor and one or more configurable setting parameters.

4. The method of claim 3, wherein the estimation of a scene depth comprises:
  defining a point of interest (POI) of the live image captured;
  identifying one or more feature points in the live image captured;
  determining a feature point depth of each of one or more feature points;
  determining a distance between the POI and each of one or more feature points;
  estimating the scene depth by obtaining computation result of:

$$\frac{\sum W(p_j)d_j}{\sum W(p_j)};$$

wherein:
    $p_j$ is the distance between a center of the POI and the feature point j;
    $d_j$ is the feature point depth of the feature point j; and
    W is a pre-defined decreasing function of $p_j$.

5. The method of claim 3, wherein the determination of a zoom factor comprises:
  determining a displacement vector of movement of the optical sensor from the recorded coordinate of the optical sensor at the location point where the last panorama is captured and the recorded coordinate of the optical sensor at the current location point where the live image is captured;
  determining a depth vector using the scene depth estimated from the live image and the relative orientation by obtaining computation result of:

$D \cos \theta \hat{i} + D \sin \theta \hat{j}$;

wherein:
    D is the scene depth estimated from the live image; and
    θ is relative orientation;
    $\hat{i}$ is the unit vector in the x direction; and
    $\hat{j}$ is the unit vector in the y direction; and
  determining the zoom factor by obtaining computation result of:

$$\frac{\vec{V} \cdot (\vec{S} + \vec{V})}{|\vec{S} + \vec{V}|^2}.$$

6. The method of claim 3, wherein the identification of the sub-image using the zoom factor and one or more configurable setting parameters comprises:
  determining a zoom factor threshold based on one or more of the configurable setting parameters, the configurable setting parameters comprise:
    one or more intrinsic characteristics of the optical sensor,
    image size of the panoramas captured,
    the electronic 3D walkthrough environment's image display window size, and
    the electronic 3D walkthrough environment's maximum-zoom-in resolution,
  comparing the zoom factor to the zoom factor threshold, and if the zoom factor does not meet the zoom factor threshold, the sub-image is unidentifiable in the panorama last captured that matches the live image captured.

7. The method of claim 1, wherein the identification of a sub-image in the panorama last captured that matches the live image captured comprises:
  defining a point of interest (POI) of the live image captured;
  obtaining an absolute angular difference between a vertical central line of horizontal view angle of the POI in the last panorama captured and the optical sensor's direct view of the POI at the current location point; and
  if the absolute angular difference is larger than one half of an angular horizontal field of view of the live image captured, then the sub-image is unidentifiable from the last panorama captured.

8. The method of claim 1, wherein the determination of whether a new panorama is required to be captured at the current location point where the optical sensor is with the current relative orientation of the optical sensor further comprises:
  determining a matching quality of the sub-image identified; and
  if the sub-image identified does not meet a quality threshold in matching the live image captured, then a new panorama is required to be captured at the current location point with the current relative orientation of the optical sensor.

9. The method of claim 1, wherein the optical sensor is a 360 camera.

10. An apparatus for generating an electronic three-dimensional (3D) walkthrough environment of a targeted environment, comprising:
  one or more optical sensors configured:
    to capture a first panorama at a first location point in the targeted environment;
    to capture panoramas at selected location points in the targeted environment; and
    to capture a live image of surrounding at each location point as the optical sensors are moved through the targeted environment;
  a positional tracking system configured:
    to measure an initial orientation of the optical sensors at each location point where a panorama is captured;
    to measure a relative orientation of the optical sensors at each location point where the live image is captured, wherein the relative orientation is measured in relative to the initial orientation; and
    to track a coordinate of the optical sensors at each location point; and
  a first processor configured:
    to determine whether a new panorama is required to be captured at the current location point where the optical sensors are with the current relative orientation of the optical sensors, comprising:
      identifying a sub-image in the panorama last captured that matches the live image captured; and
      if the sub-image cannot be identified, then a new panorama is required to be captured at the current location point with the current relative orientation of the optical sensors;
    to command the optical sensors to capture a new panorama if it is determined a new panorama is required to be captured at the current location point;
    to record the initial orientation of the optical sensors at each location point where a panorama is captured; and
    to record the coordinate of the optical sensors at each location point.

11. The apparatus of claim 10, further comprising a second processor configured to generate the electronic 3D walkthrough environment by connecting the panoramas captured to create seamless scenes of the electronic 3D walkthrough environment, and by creating a two-dimensional map of the electronic 3D walkthrough environment from the coordinates of the optical sensors recorded at the location points.

12. The apparatus of claim 10, wherein the identification of a sub-image in the panorama last captured that matches the live image captured comprises:
estimating a scene depth from the live image captured;
determining a zoom factor from a displacement vector and the relative orientation of the optical sensors at the current location point where the live image is captured, and the scene depth; and
identifying the sub-image using the zoom factor and one or more configurable setting parameters.

13. The apparatus of claim 12, wherein the estimation of a scene depth comprises:
defining a point of interest (POI) of the live image captured;
identifying one or more feature points in the live image captured;
determining a feature point depth of each of one or more feature points;
determining a distance between the POI and each of one or more feature points;
estimating the scene depth by obtaining computation result of:

$$\frac{\sum W(p_j)d_j}{\sum W(p_j)};$$

wherein:
$p_j$ is the distance between a center of the POI and the feature point j;
$d_j$ is the feature point depth of the feature point j; and
W is a pre-defined decreasing function of $p_j$.

14. The apparatus of claim 12, wherein the determination of a zoom factor comprises:
determining a displacement vector of movement of the optical sensors from the recorded coordinate of the optical sensors at the location point where the last panorama is captured and the coordinate of the optical sensors at the current location point at where the live image is captured;
determining a depth vector using the scene depth estimated from the live image and the relative orientation by obtaining computation result of:

$D \cos \theta \hat{i} + D \sin \theta \hat{j};$ wherein:
D is the scene depth estimated from the live image; and
θ is relative orientation;
$\hat{i}$ is the unit vector in the x direction; and
$\hat{j}$ is the unit vector in the y direction; and
determining the zoom factor by obtaining computation result of:

$$\frac{\vec{V} \cdot (\vec{S} + \vec{V})}{|\vec{S} + \vec{V}|^2}.$$

15. The apparatus of claim 12, wherein the identification of the sub-image using the zoom factor and one or more configurable setting parameters comprises:
determining a zoom factor threshold based on one or more of the configurable setting parameters, the configurable setting parameters comprise:
one or more intrinsic characteristics of the optical sensors,
image size of the panoramas captured,
the electronic 3D walkthrough environment's image display window size, and
the electronic 3D walkthrough environment's maximum-zoom-in resolution,
comparing the zoom factor to the zoom factor threshold, and if the zoom factor does not meet the zoom factor threshold, the sub-image is unidentifiable in the panorama last captured that matches the live image captured.

16. The apparatus of claim 10, wherein the identification of a sub-image in the panorama last captured that matches the live image captured comprises:
defining a point of interest (POI) of the live image captured;
obtaining an absolute angular difference between a vertical central line of horizontal view angle of the POI in the last panorama captured and the optical sensors' direct view of the POI at the current location point; and
if the absolute angular difference is larger than one half of an angular horizontal field of view of the live image captured, then the sub-image is unidentifiable from the last panorama captured.

17. The apparatus of claim 10, wherein the determination of whether a new panorama is required to be captured at the current location point where the optical sensors are with the current relative orientation of the optical sensors further comprise:
determining a matching quality of the sub-image identified; and
if the sub-image identified does not meet a quality threshold in matching the live image captured, then a new panorama is required to be captured at the current location point with the current relative orientation of the optical sensor.

18. The apparatus of claim 10, wherein the one or more optical sensors are configured to form a 360 camera.

* * * * *